Nov. 27, 1962

B. KIRSTEN 3,065,728

COMBINED KNOB AND DIAL

Original Filed Nov. 8, 1957

INVENTOR.
BERNDT KIRSTEN

United States Patent Office 3,065,728
Patented Nov. 27, 1962

3,065,728
COMBINED KNOB AND DIAL
Berndt Kirsten, 606 N. Gardner St., Los Angeles 36, Calif.
Original application Nov. 8, 1957, Ser. No. 695,344, now Patent No. 2,987,032, dated June 6, 1961. Divided and this application May 22, 1961, Ser. No. 103,269
6 Claims. (Cl. 116—124)

This invention relates to tuning knobs for indicating and controlling electronic and mechanical instruments and components and more particularly to front face knobs which are integral with and contain the dial and pointer therefor.

Means for illuminating the dial and pointer to provide maximum readability is also provided, thus eliminating the use of expensive internally illuminated panels. This invention relates to improvements in tuning knobs for the type disclosed in my United States Patent 2,819,698 entitled "Combined Knob and Dial," and is a division of my application Serial Number 695,344, filed November 8, 1957, now U.S. Patent No. 2,987,032. Several features of the present invention can be advantageously used on knobs disclosed in the hereinabove mentioned application.

It is therefore an object of the present invention to provide a front face combined knob and dial which includes therein a dial and pointer for easy vision and sensitive tuning.

Another object of the present invention is to provide a combined knob and dial which encloses an integral dial thus protecting the latter from dust and moisture.

A further object of the present invention is to conserve space on an instrument panel by providing an improved type knob and dial combinations.

A still further object of the present invention is to provide a dial and knob combination of novel construction which limits the angular rotation of a shaft to which it is connected within a predetermined or adjustable range.

According to the presently preferred embodiment of this invention there is provided a knob enclosing an indicia bearing dial over which a pointer may move to indicate the position of a shaft which may be fixedly inserted within the knob.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

Figure 1:
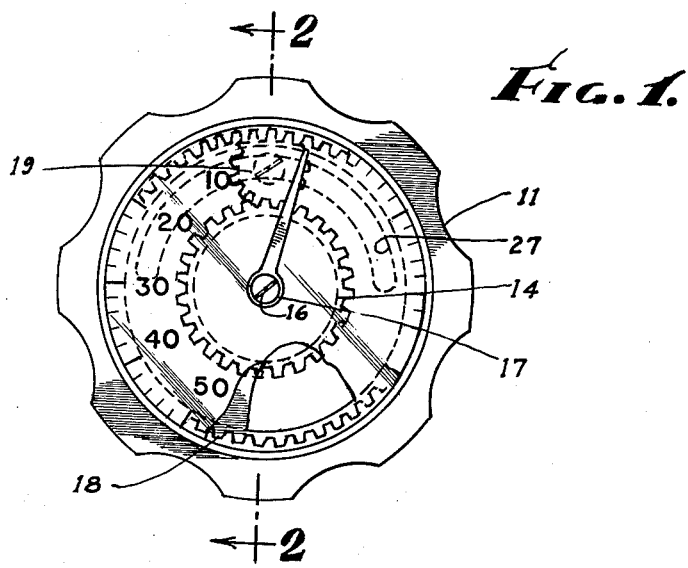
FIGURE 1 is a front elevation with parts broken away showing internal components of a combined knob and dial in accordance with the present invention.
Figure 2:
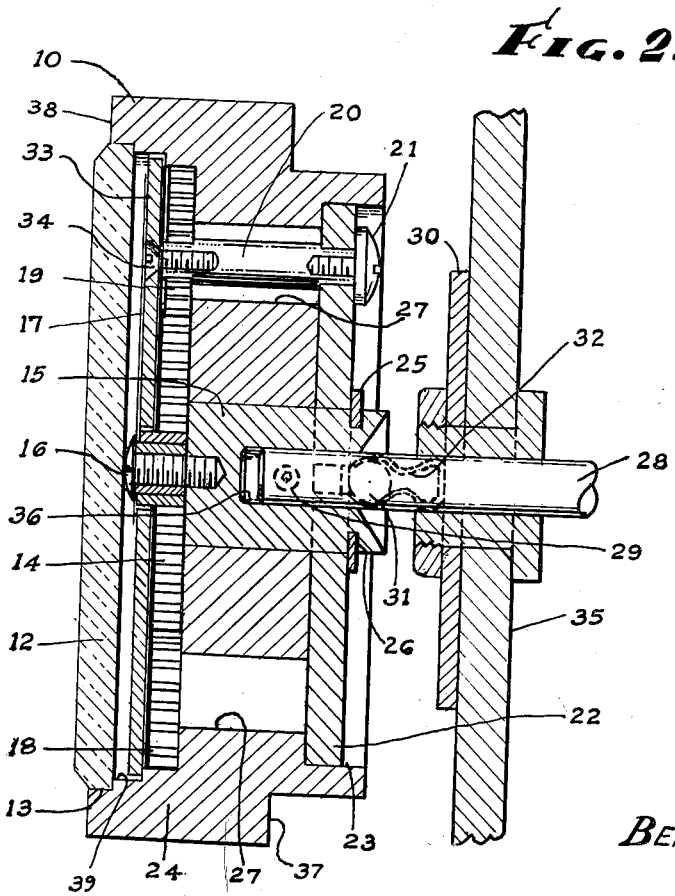
FIGURE 2 is an enlarged sectional view taken along line 2—2 of FIGURE 1.

Referring now to the drawing and particularly to FIGURES 1 and 2, there is shown a manually rotatable knob 10 which may be made of metal or plastic or any other suitable material. In FIGURE 2 the knob 10 is shown to be mounted upon an instrument panel 35 behind which the element, not shown, to be controlled, may be housed. The knob 10 is coupled to an element by shaft 28 which is secured within circular bore 36 in the center of bearing 15 by means of set screw 29. In order to facilitate manual rotation, the peripheral surface of knob 10 may be formed with spaced flutes or corrugations 11 as shown in FIGURE 1.

The knob 10 further has a cylindrical body portion 24 which may preferably be stepped down at shoulder 37, if desired, to produce a larger viewing front. The outer facing wall 38 of the knob has a circular recess 39 to accommodate dial 33, and transparent cover member 12. A sun gear 14 is mounted upon bearing 15 by threaded screw 16 sun gear 14 also holds pointer 17 in place. About the inner periphery of the knob is disposed internal gear 18. A planetary gear 19 whose teeth mesh with the teeth of gear 18 is mounted upon gear shaft 20 which is secured by threaded screw 21 to the back plate 22 which is mounted in rear recess 23 of knob body portion 24. Back plate 22 is axially restricted by snap ring 25 which is seated within annular groove 26 in the bearing 15.

An arcuate slot 27 is cut within body portion 24 of knob 10 to a predetermined arc which determines the maximum excursion of the knob. Upon turning of the knob 10 gear 18 meshing planetary gear causing the same to rotate, planetary gear 19 is also in mesh with sun gear 14 to rotate said gear in a given ratio within the limits of the arcuate slot 27.

The combined knob and dial of this embodiment may be secured to instrument control shaft 28 by means of set screw 29 within bearing 15.

An adjustment plate 30 may be employed to determine the initial angular position of back plate 22 through the interconnection of ball plugs 31 and spring clips 32. Finally, dial 33 is coupled to the gear shaft 20 by means of screw 34, which also carries the planetary gear 19. The gear shaft 20 is coupled to the back plate or ring 22 by screw 21.

Thus, the initial angular position of dial 33 is determined by the initial position of adjustment plate 30.

There has been described a new and improved knob and dial assembly which may be adapted to control a turnable device within a prescribed angular range in which the knob and dial are integral, the dial being disposed within the knob.

I claim as my invention:

1. In a combined knob and dial device for controlling the angular movement of a shaft; rotatably mounted on a panel, comprising: knob structure having an opening at the front and rear end, a dial assembly and pointer housed within said knob; said dial assembly further including a gear train; a pointer fixed to sun gear of said gear train for indicating the angular position of said knob, a back plate freely mounted rearwardly to said knob closing said rearward opening, said knob structure further having an arcuate cut, a mounting support extending through said arcuate cut, one end of said mounting support being secured to said back plate, and one gear of said gear train being rotatably mounted to the opposite side of said mounting support, means for connecting said back plate to said panel to hold said dial assembly stationary, a pointer associated with said dial to indicate the angular position of said knob in a given ratio, when said knob is rotated.

2. In a combined knob and dial assembly for controlling the angular position of a shaft, said assembly comprising: a knob forming an opening to receive a shaft, means for mounting said knob to said shaft, a gear train within said knob; one gear of said gear train being rotatably secured to one end of a mounting support and the other end of said mounting support being fixed to a supporting member, mounting means for stationary supporting said supporting member, a ring gear concentrically disposed within said knob; and ring gear meshing with said first mentioned gear; a sun gear; said sun gear meshing said first mentioned gear to indicate the angular setting of said shaft in a given ratio; when said knob is rotated.

3. In a combined knob and dial assembly as defined in claim 2 wherein said dial assembly includes a dial;

means for mounting said dial within said knob, upright indicia on the outer face of said dial, and means carried by said knob for movement over said indicia to indicate the rotative position of the knob in a given ratio.

4. In a combined knob and dial assembly as defined in claim 2 wherein said knob and dial assembly includes a backplate and a plurality of ball plugs, said ball plugs mounted on the rear end of the backplate to be inserted within the clips when said knob is mounted to said shaft, said clips and said ball plugs holding said dial assembly stationary during the rotation of said knob.

5. In a combined knob and dial assembly as defined in claim 2 wherein said dial assembly includes a gear train, and transparent means; said transparent means adapted to cover said dial and said gear train, secured within the front portion of said knob.

6. In a combined knob and dial assembly as defined in claim 2 further including an arcuate cut of predetermined radius, means within said arcuate cut to limit the angular excursion of said knob relative to said dial.

References Cited in the file of this patent

UNITED STATES PATENTS

| | | |
|---|---|---|
| 916,390 | Cuno | Mar. 23, 1909 |
| 2,424,409 | Meyer | July 22, 1947 |
| 2,456,182 | Goble | Dec. 14, 1948 |
| 2,819,698 | Kirsten | Jan. 14, 1958 |